United States Patent [19]

Jost

[11] 4,126,626
[45] Nov. 21, 1978

[54] 1-NITROARYLAMINO-5 OR 8-PHENOXY OR PHENYLMERCAPTO ANTHRAQUINONE

[75] Inventor: Max Jost, Oberwil, Switzerland

[73] Assignee: Ciba-Geigy Corporation, Ardsley, N.Y.

[21] Appl. No.: 807,952

[22] Filed: Jun. 20, 1977

[30] Foreign Application Priority Data

Jul. 2, 1976 [CH] Switzerland ............... 8503/76

[51] Int. Cl.² ............... C07C 97/24; C09B 1/32
[52] U.S. Cl. ............... 260/378; 260/380; 260/381
[58] Field of Search ............... 260/378, 380, 381

[56] References Cited

U.S. PATENT DOCUMENTS

| 1,821,040 | 9/1931 | Tesche et al. ............... 260/378 |
| 3,164,436 | 1/1965 | Altermatt ............... 260/378 |
| 3,617,174 | 11/1971 | Hohmann et al. ............... 260/378 |
| 3,632,612 | 1/1972 | Leng et al. ............... 260/378 |

FOREIGN PATENT DOCUMENTS

| 175,069 | 1/1905 | Fed. Rep. of Germany ............ 260/378 |
| 965,006 | 7/1964 | United Kingdom ............... 260/378 |

*Primary Examiner*—Allen B. Curtis
*Assistant Examiner*—Raymond Covington
*Attorney, Agent, or Firm*—Michael W. Glynn; Vincent J. Cavalieri

[57] ABSTRACT

New arylaminoanthraquinones of the formula

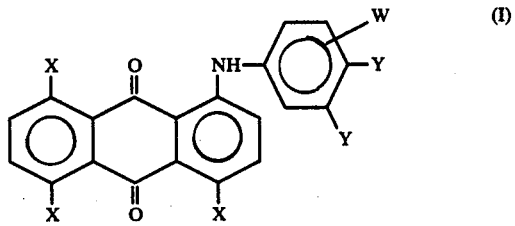

in which one X denotes an aryloxy or arylmercapto group, the other X denote hydrogen atoms, one Y denotes a nitro group and the other Y denotes a hydrogen atom and W denotes a hydrogen atom or a methyl, methoxy or trifluoromethyl group which are suitable for dyeing high-molecular organic compounds, especially for the bulk dyeing of linear polyesters.

6 Claims, No Drawings

1-NITROARYLAMINO-5 OR 8-PHENOXY OR PHENYLMERCAPTO ANTHRAQUINONE

The invention relates to arylaminoanthraquinones of the formula

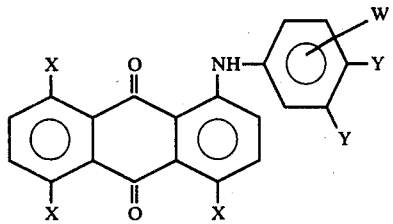

in which one X denotes an aryloxy or arylmercapto group and the other X denote hydrogen atoms, one Y denotes a nitro group and the other Y denotes a hydrogen atom and W denotes a hydrogen atom or a methyl, methoxy or trifluoromethyl group.

Preferably, one X is a group of the formula

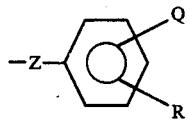

in which Z denotes an oxygen or sulphur bridge and Q and R denote hydrogen or halogen atoms, alkyl or alkoxy groups with 1 to 4 C atoms or phenyl groups which are optionally substituted by halogen atoms or alkyl or alkoxy groups with 1 to 4 C atoms, or X is a 1- or 2-naphthyloxy group or 1- or 2-naphthylmercapto group.

Compounds of the formula

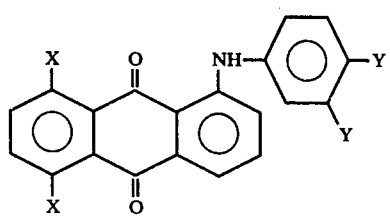

in which one X denotes a phenoxy or phenylmercapto group which is optionally substituted by halogen atoms or alkyl or alkoxy groups with 1 to 4 C atoms, the other X denotes a hydrogen atom, one Y denotes a nitro group and the other Y denotes a hydrogen atom, and especially compounds of the formula

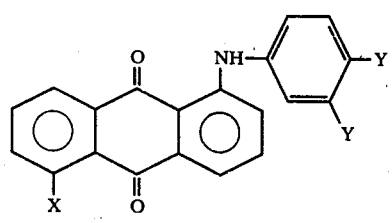

in which X denotes a phenoxy or phenylmercapto group which is optionally substituted by halogen atoms or alkyl or alkoxy groups with 1 to 4 C atoms, one Y denotes a nitro group and the other Y denotes a hydrogen atom, are of particular interest.

The dyestuffs according to the invention can be obtained by reacting an aminoanthraquinone of the formula

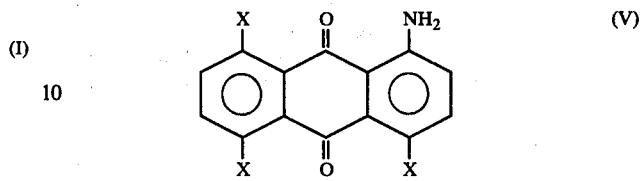

in which one X denotes an aryloxy or arylmercapto group and the other X denote hydrogen atoms, with a halogenonitrobenzene of the formula

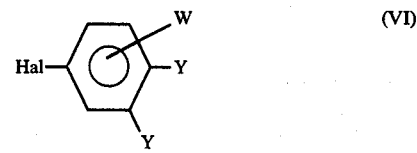

in which Y and M have the indicated meaning and Hal denotes chlorine or bromine, in the presence of an acid-binding agent, for example of an alkali metal carbonate or alkali metal acetate, and of a copper catalyst, especially of a Cu-I halide, in a higher-boiling solvent, especially nitrobenzene, appropriately at temperatures between 130°–210° C.

Examples of halogenonitrobenzenes which may be mentioned are: 1-chloro-3-nitrobenzene, 1-bromo-3-nitrobenzene, 1-chloro-4-nitrobenzene, 1-bromo-4-nitrobenzene, 1-chloro-2-trifluoromethyl-4-nitrobenzene, 1-chloro-2-methoxy-4-nitrobenzene, 1-chloro-2-methoxy-5-nitrobenzene, 1-bromo-4-methyl-3-nitrobenzene, 1-bromo-2-methyl-5-nitrobenzene, 1-chloro-2-methyl-4-nitrobenzene and 1-chloro-3-methyl-4-nitrobenzene.

Examples of aminoanthraquinones which may be mentioned are: 1-amino-4-phenoxyanthraquinone, 1-amino-5-phenoxyanthraquinone, 1-amino-8-phenoxyanthraquinone, 1-amino-4-phenylmercaptoanthraquinone, 1-amino-5-phenylmercaptoanthraquinone, 1-amino-8-phenylmercaptoanthraquinone, 1-amino-4-(4'-methoxyphenoxy)-anthraquinone, 1-amino-5-(4'-methoxyphenoxy)-anthraquinone, 1-amino-8-(4'-methoxyphenoxy)-anthraquinone, 1-amino-5-(3'-methoxyphenoxy)-anthraquinone, 1-amino-5-(2'-phenylphenoxy)-anthraquinone, 1-amino-5-(4'-phenylphenoxy)-anthraquinone, 1-amino-5-(4'-methylphenoxy)-anthraquinone, 1-amino-5-(3',5'-dimethylphenoxy)-anthraquinone, 1-amino-5-(4'-t-butylphenoxy)-anthraquinone, 1-amino-5-(1'-naphthoxy)-anthraquinone, 1-amino-5-(2'-naphthoxy)-anthraquinone, 1-amino-5-(4'-chlorophenoxy)-anthraquinone, 1-amino-5-(4'-chloro-2'-methylphenoxy)anthraquinone, 1-amino-5-(2',4'-dichlorophenoxy)-anthraquinone, 1-amino-5-(4'-chlorophenylmercapto)-anthraquinone, 1-amino-5-(2',5'-dichlorophenylmercapto)-anthraquinone, 1-amino-5-(4'-chloro-2',5'-dimethylphenylmercapto)-anthraquinone, 1-amino-5-(2',4'-dichloro-5'-methylphenylmercapto)-anthraquinone, 1-amino-5-(4'-chloro-2'-methylphenylmercapto)-anthraquinone, 1-amino-5-(3'-chloro-4'-methylphenylmercapto)-anthraquinone, 1-amino-5-(8'-chloronaphthyl-1'-mercapto)-anthraquinone, 1-amino-4-(naphthyl-2'-mercapto)-anthraquinone, 1-amino-4-(4'-methylphenoxy)-anthraquinone, 1-amino-8-(4'-methylphenoxy)-anthraquinone, 1-amino-5-(2'-chlorophenoxy)-anthraquinone, 1-amino-5-(4'-chloro-3'-methylphenoxy)-anthraquinone, 1-amino-5-(4'-methylphenylmercapto)-anthraquinone, 1-amino-5-(naphthyl-2'-mercapto)-anthraquinone and 1-amino-5-(tetrahydronaphthylmercapto)-anthraquinone.

In addition, the 1-(4'-nitroanilino)-anthraquinones according to the invention are obtained by reacting a halogenoanthraquinone of the formula

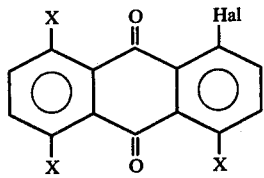

in which Hal denotes a chlorine or bromine atom, one X denotes an aryloxy or arylmercapto group and the other X denote hydrogen atoms, with 4-nitroaniline in the presence of an acid-binding agent, for example an alkali metal carbonate or alkali metal acetate, and of a copper catalyst, especially a copper-I iodide/pyridine base complex, in a high-boiling solvent, especially o-dichlorobenzene or nitrobenzene, appropriately at temperatures between 130°–210° C.

Examples of suitable halogenoanthraquinones which may be mentioned are: 1-chloro-4-phenoxyanthraquinone, 1-chloro-5-phenoxyanthraquinone, 1-chloro-8-phenoxyanthraquinone, 1-chloro-4-phenylmercaptoanthraquinone, 1-chloro-5-phenylmercaptoanthraquinone, 1-chloro-8-phenylmercaptoanthraquinone, 1-chloro-5-naphthoxyanthraquinone, 1-chloro-8-naphthoxyanthraquinone and the corresponding 1-bromo compounds.

The resulting arylaminoanthraquinones are suitable for dyeing high-molecular organic compounds, for example cellulose, cellulose ethers and cellulose esters, such as ethylcellulose, nitrocellulose, celluose acetate or cellulose butyrate, and polyesters, natural resins or synthetic resins, such as polymerisation resins or condensation resins, for example aminoplasts, especially urea/formaldehyde and melamine/formaldehyde resins, alkyd resins, phenoplasts, polycarbonates, polyolefins, such as polystyrene, polyvinyl chloride, polyethylene, polypropylene, polyacrylonitrile, polyacrylic acid esters, casein, silicone and silicone resins, on their own or as mixtures.

It is immaterial whether the high-molecular compounds mentioned are in the form of plastic compositions or melts or in the form of spinning solutions, lacquers, paints or printing inks.

In order to achieve special effects, such as, for example, improved solubility in thermoplastics, it can be advantageous to mix colorants according to the present invention with one another or with other suitable colorants or to obtain mixtures direct by suitable choice of different starting materials.

The dyestuffs according to the invention, which are soluble in organic media, are preferentially suitable for the bulk dyeing of spinnable polymers, especially of linear polyesters.

Linear polyesters which may be mentioned are, in particular, those which are obtained by a polycondensation reaction of terephthalic acid or its esters with glycols of the formula HO—(CH$_2$)$_n$—OH, in which $n$ denotes the number 2–10, or with 1,4-di-(hydroxymethyl)-cyclohexane or by a polycondensation reaction of glycol ethers of hydroxybenzoic acids, for example p-(β-hydroxyethoxy)-benzoic acid. The concept linear polyesters also includes copolyesters which are obtained by partially replacing the terephthalic acid by another dicarboxylic acid or a hydroxycarboxylic acid and/or by partially replacing the glycol by another diol.

However, the polyethylene terephthalates are of particular interest.

The linear polyesters to be dyed are appropriately intimately mixed, in the form of powders, chips or granules, with the dyestuff. This can be effected, for example, by coating the polyester particles with the finely divided dry dyestuff powder or by treating the polyester particles with a solution or dispersion of the dyestuff in an organic solvent and subsequently removing the solvent.

Finally, the substance to be dyed can also be added direct to the molten polyester.

The ratio of dyestuff to polyester can vary within wide limits, depending on the desired depth of colour. In general, it is advisable to use 0.01–2 parts of dyestuff per 100 parts of polyester.

The polyester particles which have been treated in this way are melted by known processes in an extruder and extruded to give articles, especially films or fibres, or cast to give sheets.

The dyeing of polymers other than polyesters and the application of the dyed polymers is carried out by processes which are identical or similar to those described above.

Uniformly and intensely coloured articles of high fastness to light are obtained. The dyed fibres which are obtainable according to the process are also distinguished by outstanding fastness to wet processing and dry cleaning.

A particular advantage of the dyestuffs to be used according to the invention is that they dissolve in the polyester melt and, surprisingly, withstand high temperatures of up to 300° C. without undergoing decomposition, so that considerably clearer dyeings are obtained than when insoluble pigments are used.

Compared with 1-(4'-nitroanilino)-4-(4'-methylanilino)-anthraquinone, which is known from Russian Patent Specification No. 173,863, the compounds according to the invention are distinguished by outstanding fastness to rubbing after thermofixing as a 2% strength dyeing, and compared with 2',4'-dinitroanilinoanthraquinones, which are known from German Patent Specification No. 865,907, the compounds according to the invention are distinguished by a considerably better stability to heat.

Compared with 1-(3'-nitroanilino)-anthraquinone, which is known from German Patent Specification No. 889,595, and 1-(4'-nitroanilino)-anthraquinone, which is described in German Patent Specification No. 175,069 and in Liebig's Ann. Chemie 380, page 322, the compounds according to the invention are distinguished by excellent characteristics with regard to the staining of non-dyed polyester comparison fabric during thermofixing.

In the examples which follow, the parts denote parts by weight, the percentages denote percentages by weight and the temperatures are given in degrees centigrade.

EXAMPLE 1

33.1 parts of 1-amino-5-phenylmercapto-anthraquinone, 26.4 parts of 4-nitrobromobenzene and 10 parts of sodium carbonate in 190 parts of nitrobenzene are heated to the boil, whilst stirring. In order to remove moisture, a stream of nitrogen is passed through the reaction vessel for 1 hour. 0.6 part of copper-I chloride is added to the mixture, which has cooled to 165°, and the mixture is kept at 165°, whilst continuing to pass a stream of nitrogen through the vessel, until the reaction has ended. The resulting 1-(4'-nitroanilino)-5-phenylmercaptoanthraquinone is filtered off from the cooled mixture and washed with nitrobenzene, ethanol and hot water. After boiling thoroughly with 5% strength hydrochloric acid, the colorant is obtained in the form of a red powder.

Analysis of a sample crystallised from chlorobenzene: calculated: C 69.17; H 3.35; N 6.20; S 7.10%. found: C 68.6; H 3.7; N 6.2; S 7.3%.

The colorant has a melting point of 245°.

EXAMPLE 2

Use example in polyester

Non-delustered polyethylene terephthalate granules suitable for the production of fibres are shaken together with 1% of the dyestuff according to Example 1, in a vessel which can be closed, for 15 minutes on a shaking machine. The uniformly coloured granule grains are spun to filaments in a melt spinning installation (285° ± 3°, residence time in the spinning composition about 5 minutes) and the filaments are stretched on a draw-twisting installation and wound up. Because of the solubility of the dyestuff in polyethylene terephthalate, an orange dyeing is obtained which is distinguished by excellent fastness to light and outstanding fastness to washing, dry cleaning, cross dyeing, sublimation and rubbing after thermofixing and also by high resistance to chlorite bleach.

Test to determine the fastness to rubbing after thermofixing (a) Thermofixing A sample of the dyed material is treated for 30 seconds at 210° in a precision ironing press and, in addition, afterfixed for 30 minutes at 135° (SNV 195,833/1961; DIN 54,060/1962 and ISO/R 105'IV, Part 2).

(b) Test to determine the fastness to rubbing

Dry cotton or polyethylene terephthalate fabric which has not been dyed is moved ten times backwards and forwards over a 10 cm long sample of the dyed and thermofixed material in the course of 10 seconds, under a pressure of 900 g, in a Crockmeter. The staining of the non-dyed material is assessed. (SNV 195,831; DIN 54,021/1958 and ISO/R 105, Part 18).

(c) Test to determine staining during thermofixing

A sample of the dyed material is treated together with a comparison fabric (polyester), which has not been dyed, for 30 seconds at 210° in a precision ironing press. (SNV 195,833/1961; DIN 54,060/1962 and ISO/R 105/IV Part 2).

EXAMPLE 3

1,000 parts of polyethylene terephthalate granules, 10 parts of titanium oxide (Kronos RN 40) and 1 part of finely divided 1-(4'-nitroanilino)-5-phenylmercapto-anthraquinone according to Example 1 are mixed in a closed vessel for 2 hours on a roller frame. The dyed granules are extruded at about 260° to give strands of 2 mm diameter and these are granulated again. The resulting granules are injection-moulded in an Anker screw injection moulding machine at 270°-280° to give mouldings. An orange-coloured moulding with very good stability to light is obtained.

EXAMPLES 4–25

If, in Example 1, 1-amino-5-phenylmercaptoanthraquinone is replaced by correspondingly substituted 1-aminoanthraquinones, the following colorants are obtained:

|   | | Melting point | Shade of a bulk dyeing on polyester |
|---|---|---|---|
| 4) | 1-(4'-nitrophenylamino)-4-phenyl-mercaptoanthraquinone | 245° | claret |
| 5) | 1-(4'-nitrophenylamino)-5-phenoxy-anthraquinone | 241° | orange |
| 6) | 1-(4'-nitrophenylamino)-5-(3",5"-dimethylphenoxy)-anthraquinone | 226° | orange |
| 7) | 1-(4'-nitrophenylamino)-5-(2"-methyl-4"-chlorophenoxy)-anthraquinone | 298–303° | orange |
| 8) | 1-(4'-nitrophenylamino)-5-(2"-chlorophenoxy)-anthraquinone | 239–243° | orange |
| 9) | 1-(4'-nitrophenylamino)-5-(4"-phenylphenoxy)-anthraquinone | 249–252° | orange |
| 10) | 1-(4'-nitrophenylamino)-5-(3"-methyl-4"chlorophenoxy)-anthraquinone | 302–303° | orange |
| 11) | 1-(4'-nitrophenylamino)-5-(2"-phenylphenoxy)-anthraquinone | 181–182° | orange |
| 12) | 1-(4'-nitrophenylamino)-5-(3"-methoxyphenoxy)-anthraquinone | 188–192° | orange |
| 13) | 1-(4'-nitrophenylamino)-5-(4"-methylphenoxy)-anthraquinone | 272–274° | orange |
| 14) | 1-(4'-nitrophenylamino)-4-(4"-methylphenoxy)-anthraquinone | 201–204° | brown-red |
| 15) | 1-(4'-nitrophenylamino)-8-(4"-methylphenoxy)-anthraquinone | 219–221° | orange |
| 16) | 1-(4'-nitrophenylamino)-8-phenoxyanthraquinone | 200–201° | orange |
| 17) | 1-(4'-nitrophenylamino)-5-(4"-methoxyphenoxy)-anthraquinone | 263–266° | orange |
| 18) | 1-(4'-nitrophenylamino)-5-(4"-t-butylphenoxy)-anthraquinone | 238–239° | orange |
| 19) | 1-(4'-nitrophenylamino)-5-(4"-chlorophenoxy)-anthraquinone | above 300° | orange |
| 20) | 1-(4'-nitrophenylamino)-4-phenoxyanthraquinone | 208–210° | red |
| 21) | 1-(4'-nitrophenylamino)-5-(4"-methylphenylmercapto)-anthraquinone | above 300° | orange |
| 22) | 1-(4'-nitrophenylamino)-5-(2",5"-dichlorophenylmercapto)-anthraquinone | 255–258° | orange |
| 23) | 1-(4'-nitroanilino)-5-(4"-chlorophenylmercapto)-anthraquinone | above 300° | orange |
| 24) | 1-(4'-nitroanilino)-5-(tetrahydronaphthylmercapto)-anthraquinone | 273° | orange |
| 25) | 1-(4'-nitroanilino)-8-phenylmercapto-anthraquinone | 274–276° | orange |

EXAMPLE 26

A mixture of 9.87 parts of 1-bromo-5-phenylmercaptoanthraquinone (melting point 191°–193°), 4.32 parts of 4-nitroaniline, 2.5 parts of sodium carbonate, 58 parts of o-dichlorobenzene, 6 parts of toluene and a solution of 0.4 part of copper-I iodide in 1.5 parts of pyridine is heated to the boil (160°–165°) for 24 hours, whilst stirring. The water which is liberated in the course of the reaction is separated off by means of a water separator.

After stirring for 3 hours at 20°, the reaction product is filtered off, washed in portions with a little o-dichlorobenzene, then with methanol and also with water and finally heated to the boil with 5% strength hydrochloric acid. After filtering, washing and drying, 9.03 parts, that is to say 80% of theory, of 1-(4'-nitrophenylamino)-5-phenylmercaptoanthraquinone with a melting point of 242°–244° are obtained. The properties of this compound are completely identical to those of the colorant obtained according to Example 1.

EXAMPLE 27

A mixture of 23.2 parts of 1-amino-5-phenylmercaptoanthraquinone, 14.35 parts of 1-chloro-3-nitrobenzene, 7 parts of sodium carbonate and 140 parts of nitrobenzene is dehydrated in the course of one hour, whilst stirring at the boiling point and whilst passing a stream of nitrogen through the mixture. After adding 0.42 part of copper-I chloride, the mixture is kept at 205°–210° for 18 hours, whilst a moderate stream of nitrogen is passed through. After cooling to 20°, the reaction product is filtered off, washed with nitrobenzene, ethanol and hot water and finally heated to the boil with 5% strength hydrochloric acid, filtered off, washed until acidfree and dried. This gives 25.7 parts (81% of theory) of 1-(3'-nitrophenylamino)-5-phenylmercaptoanthraquinone; melting point 246°. The colorant dyes polyester orange in bulk.

EXAMPLES 28–32

If, in Example 27, 1-amino-5-phenylmercaptoanthraquinone is replaced by correspondingly substituted 1-aminoanthraquinone derivatives, the following colorants are obtained:

| | Melting point | Shade of a bulk dyeing on polyester |
|---|---|---|
| 28) 1-(3'-nitrophenylamino)-4-phenyl-mercapto-anthraquinone | 217–219° | violet |
| 29) 1-(3'-nitrophenylamino)-8-phenoxy-anthraquinone | 184–185° | orange |
| 30) 1-(3'-nitrophenylamino)-5-(4''-t-butylphenoxy)-anthraquinone | 205–206° | orange |
| 31) 1-(3'-nitrophenylamino)-5-(naphthyl-2''-mercapto)-anthraquinone | 294–296° | orange |
| 32) 1-(3'-nitrophenylamino)-5-(4''-phenylphenoxy)-anthraquinone | 240–242° | orange |

EXAMPLE 33

A suspension of 20 parts of 1-amino-5-(naphthyl-2'-mercapto)-anthraquinone, 10.75 parts of 1-chloro-4-nitrobenzene and 5.5 parts of sodium carbonate in 100 parts of nitrobenzene is heated to the boil and dehydrated in the course of one hour, whilst passing a stream of nitrogen through the mixture. After adding 0.32 part of copper-I chloride, the mixture is stirred at 205°–210° for 15 hours, whilst a moderate stream of nitrogen is passed through. The reaction product is filtered off at 20°, washed with nitrobenzene, ethanol and hot water and finally heated to the boil in 5% strength hydrochloric acid, filtered off, washed and dried. This gives 21.1 parts (80% of theory) of 1-(4'-nitrophenylamino)-5-(naphthyl-2''-mercapto)-anthraquinone; melting point above 300°. The colorant dyes polyester orange in bulk.

EXAMPLE 34

If, in Example 33, 1-amino-5-(naphthyl-2'-mercapto)anthraquinone is replaced by a corresponding amount of 1-amino-5-(4'-phenylphenoxy)-anthraquinone, 1-(4'-nitroanilino)-5-(4''-phenylphenoxy)-anthraquinone is obtained; melting point 252°–253°. The colorant dyes polyester orange in bulk.

EXAMPLES 35–37

If 1-bromo-3-nitrobenzene is reacted with correspondingly substituted 1-aminoanthraquinones, analogously to Example 1, the following compounds are obtained:

| | Melting point | Shade of a bulk dyeing on polyester |
|---|---|---|
| 35) 1-(3'-nitrophenylamino)-5-(4''-chlorophenylmercapto)-anthraquinone | 270–271° | orange |
| 36) 1-(3'-nitrophenylamino)-8-phenylmercaptoanthraquinone | 223° | orange-red |
| 37) 1-(3'-nitrophenylamino)-5-(tetrahydronaphthylmercapto)-anthraquinone | 276–277° | orange |

EXAMPLE 38

A mixture of 23.2 parts of 1-amino-4-phenylmercaptoanthraquinone, 9 parts of sodium carbonate and 150 parts of nitrobenzene is heated to the boil, whilst stirring, and dehydrated in the course of one hour, whilst a stream of nitrogen is passed through. 30 parts of 4-bromo-2-nitrotoluene and 1 part of copper-I chloride are then added to the mixture, which has been cooled to 150°. After stirring for 15 hours at 150° and, at the same time, passing a moderate stream of nitrogen through the mixture, the reaction mixture is allowed to cool. The reaction product is precipitated by gradually adding 200 parts of methanol and is filtered off, washed with methanol and hot water and finally boiled thoroughly with 5% strength hydrochloric acid. This gives 29.5 parts (90% of theory) of 1-(4'-methyl-3'-nitrophenylamino)-4-phenylmercaptoanthraquinone with a melting point of 199°–201°. The colorant dyes polyester violet in bulk.

EXAMPLES 39–45

If the halogenonitrobenzene derivatives listed below are reacted with 1-amino-5-phenylmercaptoanthraquinone, the following compounds are obtained:

| | | Process according to Example | | melting point | Shade of a bulk dyeing of polyester |
|---|---|---|---|---|---|
| 39) | 1-chloro-2-trifluoromethyl-4-nitrobenzene | 27 | 1-(2'-trifluoromethyl-4'-nitrophenylamino)-5-phenylmercapto-anthraquinone | 280–281° | yellowish-tinged orange |
| 40) | 1-chloro-2-methoxy-4-nitrobenzene | 27 | 1-(2'-methoxy-4'-nitrophenylamino)-5-phenylmercapto-anthraquinone | 307–308° | brown-orange |

| | Process according to Example | | melting point | Shade of a bulk dyeing of polyester |
|---|---|---|---|---|
| 41) 1-chloro-2-methoxy-5-nitrobenzene | 27 | 1-(2'-methoxy-5'-nitrophenylamino)-5-phenylmercapto-anthraquinone | 269-270° | red |
| 42) 1-bromo-4-methyl-3-nitrobenzene | 38 | 1-(4'-methyl-3'-nitrophenylamino)-5-phenylmercapto-anthraquinone | 266-268° | red |
| 43) 1-bromo-2-methyl-5-nitrobenzene | 1 | 1-(2'-methyl-5'-nitrophenylamino)-5-phenylmercapto-anthraquinone | 241-242° | brown-orange |
| 44) 1-chloro-2-methyl-4-nitrobenzene | 27 | 1-(2'-methyl-4'-nitrophenylamino)-5-phenylmercapto-anthraquinone | 279-280° | brown-orange |
| 45) 1-chloro-3-methyl-4-nitrobenzene | 27 reaction at 180° | 1-(3'-methyl-4'-nitrophenylamino)-5-phenylmercapto-anthraquinone | 262-263° | orange |

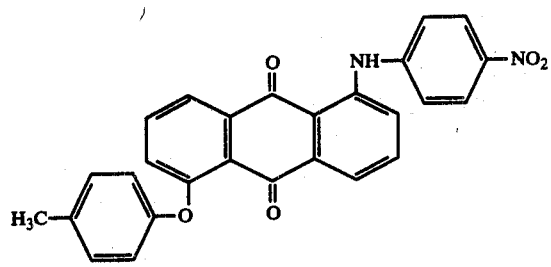

What is claimed is:

1. An arylaminoanthraquinone of the formula

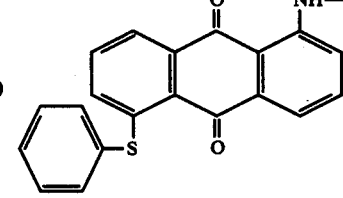

wherein one X is phenoxy or phenylmercapto which are unsubstituted or substituted by halo, alkyl of 1-4 carbon atoms or alkoxy of 1-4 carbon atoms, the other X is hydrogen, one Y is nitro and the other Y is hydrogen.

2. An arylaminoanthraquinone according to claim 1, of the formula

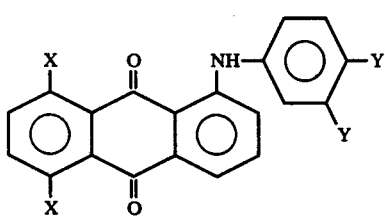

wherein X is phenoxy or phenylmercapto which are unsubstituted or substituted by halo, alkyl of 1-4 carbon atoms or alkoxy of 1-4 carbon atoms, one Y is nitro and the other Y is hydrogen.

3. An arylaminoanthraquinone according to claim 2, of the formula

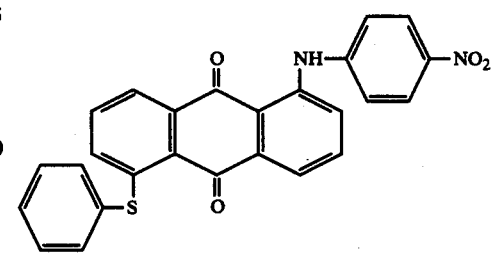

4. An arylaminoanthraquinone according to claim 1, of the formula

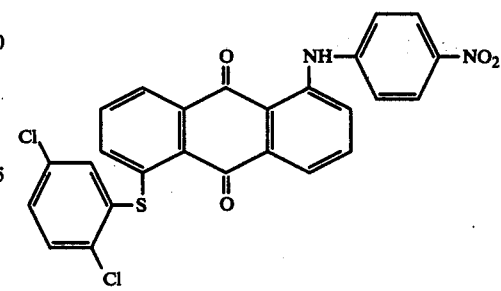

5. An arylaminoanthraquinone according to claim 1, of the formula

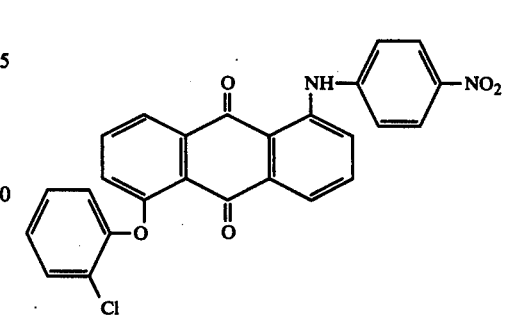

6. An arylaminoanthraquinone according to claim 1, of the formula